United States Patent [19]

Bernhardt

[11] Patent Number: 5,435,914
[45] Date of Patent: Jul. 25, 1995

[54] CLARIFYING ARRANGEMENT FOR WASTE WATER

[75] Inventor: Bruno Bernhardt, Reutlingen, Germany

[73] Assignee: IEG Industrie-Engineering GmbH, Betzingen, Germany

[21] Appl. No.: 42,163

[22] Filed: Apr. 2, 1993

[30] Foreign Application Priority Data

Apr. 7, 1992 [DE] Germany .................. 42 11 567.1
Oct. 5, 1992 [DE] Germany .................. 42 33 423.3

[51] Int. Cl.⁶ .................. C02F 3/26; C02F 3/22; C02F 9/00
[52] U.S. Cl. .................. 210/220; 210/205; 210/252; 210/258; 210/255; 210/262; 210/322; 210/521; 210/534
[58] Field of Search .................. 210/258, 220, 252, 205, 210/322, 521, 522, 534, 620, 758, 221.1, 255, 262

[56] References Cited

U.S. PATENT DOCUMENTS

| | | |
|---|---|---|
| Re. 26,931 | 7/1970 | Valdespino . |
| 1,790,975 | 2/1931 | Dallas . |
| 2,380,465 | 7/1945 | Proudman . |
| 2,430,519 | 11/1947 | Mallory . |
| 2,678,912 | 5/1954 | Kalinske . |
| 3,049,489 | 8/1962 | Ciabattari . |
| 3,054,602 | 9/1962 | Proudman . |
| 3,133,017 | 5/1964 | Lambeth . |
| 3,133,130 | 5/1964 | Lambeth . |
| 3,382,981 | 5/1968 | Hampton . |
| 3,477,949 | 11/1969 | Liljendahl . |
| 3,497,064 | 2/1970 | Valdespino . |
| 3,547,815 | 12/1970 | McWhirter . |
| 3,627,136 | 12/1971 | Mackrle . |
| 3,705,650 | 12/1972 | Gotte . |
| 3,883,424 | 5/1975 | Stamllesky . |
| 3,925,208 | 12/1975 | Yost . |
| 3,975,276 | 8/1976 | Schmid . |
| 4,142,975 | 3/1979 | Kiuzer . |
| 4,179,366 | 12/1979 | Kaelin . |
| 4,238,338 | 12/1980 | Kinzer . |
| 4,374,730 | 2/1983 | Braha . |
| 4,376,702 | 3/1983 | Small . |
| 4,416,781 | 11/1983 | Bailey . |
| 4,863,595 | 9/1989 | Nodholm . |
| 4,961,842 | 10/1990 | Schulz . |
| 4,961,854 | 10/1990 | Wittmann . |
| 5,133,853 | 7/1992 | Mattsson . |
| 5,217,617 | 6/1993 | Duncan . |

FOREIGN PATENT DOCUMENTS

| | | |
|---|---|---|
| 2041324 | 10/1992 | Canada . |
| 385555 | 9/1990 | European Pat. Off. . |
| 2742568 | 3/1978 | Germany . |
| 3223978 | 2/1983 | Germany . |
| 3147920 | 10/1983 | Germany . |
| 3332074 | 5/1985 | Germany . |
| 4022639 | 1/1992 | Germany . |
| 136755 | 10/1979 | Japan . |
| 1542916 | 2/1990 | Russian Federation . |
| 2058036 | 4/1981 | United Kingdom . |
| 2112768 | 7/1983 | United Kingdom . |
| 2142008 | 1/1985 | United Kingdom . |
| 2153243 | 8/1985 | United Kingdom . |
| 2216113 | 10/1989 | United Kingdom . |
| 2243603 | 11/1991 | United Kingdom . |
| 672155 | 7/1979 | U.S.S.R. . |
| 969681 | 10/1982 | U.S.S.R. . |

OTHER PUBLICATIONS

K. R. Dietrich, "Die Abwassertechnik—Funktionsprinzipien und Leistung der Reinigungsverfahren", 1973, pp. 354 & 356.

Mack, Wolfgang, "Das Rohrreaktor-Verfahren Biozwei", Jun. 1984, pp. 18–21.

Patent Abstracts of Japan 59-213495 A, C-274, Apr. 6, 1985, vol. 9, No. 78.

Patent Abstracts of Japan 2-298398 A, C-808, Feb. 20, 1991, vol. 15, No. 72.

*Primary Examiner*—Thomas M. Lithgow
*Attorney, Agent, or Firm*—Michael J. Striker

[57] ABSTRACT

A clarifying device for waste water has a plurality of containers for receiving waste water, and a device for aerating or gasifying waste water in at least one of the containers. The containers are formed as treatment cells which are combinable with one another to provide a waste water throughflow and which are small when compared with conventional clarifying reservoirs. The treatment cells are closed from outside. A negative pressure source is connected with the treatment cells for producing negative pressure in the latter.

14 Claims, 8 Drawing Sheets

CLARIFYING ARRANGEMENT FOR WASTE WATER

BACKGROUND OF THE INVENTION

The present invention relates to a clarifying arrangement for waste water comprising containers for receiving the waste water and a device for aerating and gasifying the waste water in at least one container.

It is known to supply the waste water of a community or a town to a collecting clarifying arrangement in which liquid and solid components of the waste water are subjected to a clarifying treatment. The waste water is first supplied to big open reservoirs in which deposits of solid matter and/or an aeration of the waste water is performed. The great space consumption of such collecting clarifying arrangements is caused mainly by the big open clarifying reservoirs, which are also responsible for the known smell due to such installations. The aeration of the clarifying reservoir is performed by pumping of pressure air into the clarifying reservoirs, and for a favorable air bubbles generation a relatively high waste water level over the nozzle bodies must be provided. With increasing size of the clarifying reservoirs the probability of building of flow dead spaces and regions with non-uniform waste water flow increases. This is of a substantial disadvantage especially in biologically operating clarification arrangements. The negative aspect here is that during the increase of the introduced pressurized air the air is substantially warmed up and this warming is also transmitted to the waste water. The optimal efficiency of bacteria utilized in biological clarifying arrangements is however approximately at 35° C. When the water temperature exceeds 40°, the efficiency steeply reduces.

SUMMARY OF THE INVENTION

Accordingly, it is an object of the present invention to provide a clarifying arrangement in which an available space is utilized better and the energy consumption is more favorable than in conventional clarifying arrangements with open reservoirs and a pressurized gas aeration.

In keeping with these objects and with others which will become apparent hereinafter, one feature of the present invention resides, briefly stated, in a clarifying arrangement for waste water in which a container is formed by several small treatment cells which are combined with one another for a waste water throughflow and are small when compared with conventional clarifying reservoirs, wherein the treatment cells are closed from outside and are provided with a negative pressure by a connection to a negative pressure source. Preferably, each treatment cell under its waste water level can have at least one stationary or moveable gas supplying body provided with a gas permeable wall. Gas, in particular air, can be aspirated from the gas supplying body and through the waste water in bubbles upwardly under the action or co-action of the negative pressure acting in the treatment cells.

The above described disadvantages of conventional clarifying arrangements can be eliminated by the use of smaller and closed treatment cells. Their hydraulically favorable form and the aeration depth can be maintained by the negative pressure in the treatment cells under a meter water column. Due to the closed treatment cells the waste water temperature losses can be avoided. Simultaneously an additional warming up of the waste water due to the utilized treatment gas, which is especially undesirable and damaging in biologically operating clarifying arrangements, is avoided since due to the negative pressure at least some cooling of the utilized gas is performed.

The small treatment cells which are combined with one another facilitate a decentralization of the clarifying arrangement and its distribution into individual partial arrangements which are close to a generator. Due to the closed construction of the clarifying arrangement, a smell and contamination loading of the environment is avoided. The negative pressure aeration of the treatment cells requires a considerably lower energy consumption than a positive pressure aeration. The lower suction air flow temperature increases the oxygen solubility on the limiting surfaces of the air bubbles which are formed there, and the comparatively smaller aspirating pressure prevents the formation of a high energy loss-prone flow energy density on the aspiration or injection locations. The closed treatment cells provide also a gas treatment of the waste water in a circulation process and thereby also the efficient use of special treatment gases, for example pure oxygen. Here also a combined negative pressure and a pressure aeration of the waste water is possible, when for example gas is supplied or withdrawn under relatively low positive pressure in the gas supplying body.

In the clarifying arrangement formed in accordance with the present invention, the treatment cells can have different constructions and different gasifying devices. For example, the treatment cells can be formed by at least one approximately vertical intermediate wall which is provided both above and below with at least one connecting opening and subdivided into two chambers, with a first chamber provided with a clarifying water inlet and a second chamber provided with a clarifying water outlet. The waste water moves in such treatment cells as in a U-shaped tube. Since due to the negative pressure a lifting of the water level is possible, which is supported by the so-called airlift effect of the raising gas bubbles in the gasifying device, the clarifying water inlet and the clarifying water outlet in the treatment cells formed in accordance with the present invention can be offset relative to one another in a vertical direction. When at least one gas supplying body is arranged in the chamber of the treatment cells which is provided with the clarifying water outlet and/or with a combination of several treatment cells the negative pressure is effective over the clarifying water outlet in the treatment cells, the clarifying water outlet can be arranged higher than the clarifying water inlet and thereby a subsequent treatment cell can be located higher than the preceding treatment cell. When the clarifying arrangement is designed in accordance with the present invention, the special pumps provided with damaging transporting elements which mechanically act on the waste water and especially biological clarifying mass, as well as conventional transporting screws for vertical transportation of the waste water are dispensed with.

With a combination of several treatment cells, the outlet of a treatment cell can lead to the inlet of a subsequent treatment cell. The inlet of the first treatment cell as considered in the waste water throughflow direction can be connected through a syphon with a waste water supply passage and the waste water free region of the last treatment cell can be connected with a common negative pressure source.

Treatment cell packs with treatment cells located near one another at the same height or offset relative to one another in a vertical direction are produced similarly to the storage tanks from blanks which are welded with one another or from castings of sheet metal or synthetic plastic material. The treatment cell packs can be formed however as concrete elements. The plurality of the design possibilities is favorable for the conversion of the conventional clarifying arrangements since the free spaces, reservoir sections etc. can be used favorably. The treatment cells can be arranged as multi-story structures and the clarifying water can be liftable by an air lifting device from a deepest level to a higher level. For example round clarifying reservoirs can be filled with a multi-story clarifying arrangement designed in accordance with the present invention.

The treatment cells can be formed as tubular bodies. At the ends of tubular treatment cell which is used individually or a treatment cell group, a pre-clarifying container or a post-clarifying container can be arranged. The gas supplying body can be formed advantageously as a tube which is movable in the waste water and extends in a longitudinal direction of the treatment cell. The negative pressure generation in the tubular treatment cell or treatment cell group does not cause any difficulties for the pressure free pre-clarifying and post-clarifying containers, since the tubular treatment cell can be closed at its end sides at least partially by a wall extending to a minimum waste water level and over the half tubular portion and leaves a sufficiently great waste water throughflow opening. Great open aeration reservoirs can be also replaced by a lying tube produced for example from prefabricated concrete bodies. Such a clarification tube for individual grate generators of waste water can be laid together with the pre-clarifying and post-clarifying container in an excavated trenches also under streets and squares. An intense treatment of the waste water by gasifying is guaranteed, since the gas exiting the gasifying and aerating tube in the throughflowing waste water releases a flow transverse to the longitudinal direction of the tubular treatment cells. Due to the guiding walls arranged at a distance from the gas supplying tube inside the waste water region, a circulating flow is provided and it overlaps with the slow throughflow of the waste water through the tube and insures the intense gasifying of the total quantity of waste water.

In all embodiments of the treatment cells mud deposition region are formed on the bottom of the treatment cells. They are emptied through closeable emptying openings or by means of a built in transporting device. Dispersing bodies which are movable in the waste water can be additionally arranged in the treatment cells. They can be formed as axially displaceable disc bodies with throughflow openings which are limited by round wires acting in accordance with a Coanda-effect. The uniformity of the obtained speed profile of the waste water and the gasification flow is especially important in bioreactors. There it is important to avoid shearing forces which can destroy the microorganism cultures.

In the clarifying arrangement formed in accordance with the present invention, especially biological waste water clarification can be performed fast and efficient. It has been shown that simple fans can be utilized as negative pressure generators and only a low warming up of the transported air or the transported gas is caused, which is important during a resupply of the gas into the circulating processes. A clarifying device assembled from several treatment cell packs provides for a different waste water treatment in individual packs. In this situation a treatment process can be advantageous in accordance with which the negative pressure is provided in pulses and a negative pressure generator or the gas supply are operated correspondingly. It can be also advantageous for example depending on the acting outside temperature or the composition of the waste water to be treated, when a part of the gasifying volume is resupplied into the treatment cells and only a partial stream is released through the filter outside and replaced by a corresponding fresh gas supply. In each case the clarifying arrangement in accordance with the present invention facilitates the treatment of special waste water, for example the treatment of the problem waters "manure" in animal holding facilities.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
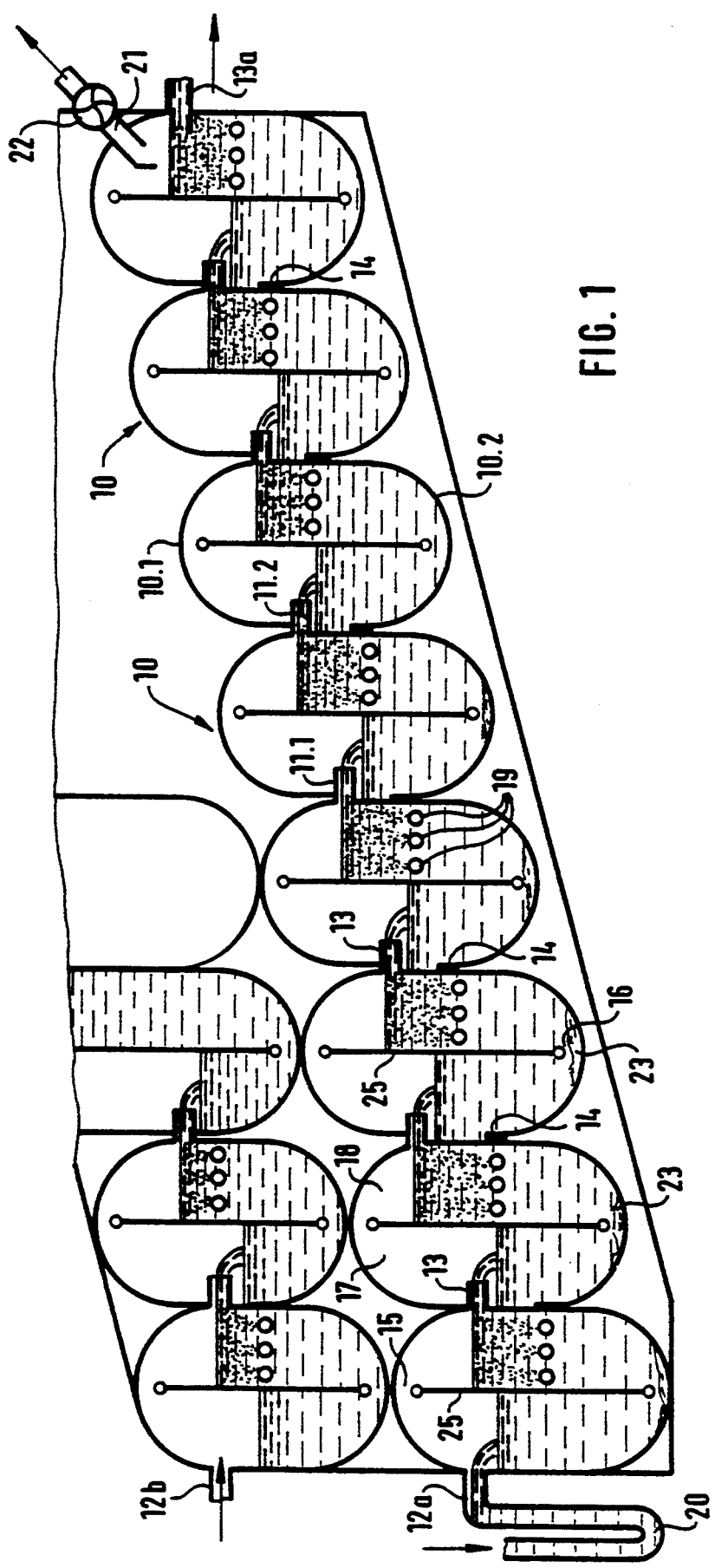
FIG. 1 is a view showing a clarifying device for waste water in accordance with a first embodiment of the resent invention, with several combined treatment cells arranged vertically.

FIG. 1 shows a pack of eight treatment cells 10 which are formed as tank containers with an oval cross-section and combined with one another in a raising sequence. The treatment cells are formed by an upper and lower trough-shaped castings 10.1 and 10.2 which are connected with one another by not shown container end walls. Flange edges 11.1 and 11.2 of both metal sheet castings 10.1 and 10.2 extend along the length of the treatment cells 10 and are spaced from one another so as to limit a gap-shaped waste water inlet 12 and a gap-shaped waste water outlet 13. In the pack of the treatment cells 10 the clarifying water outlet forms simultaneously the clarifying water inlet of the subsequent treatment cell 10. The lower castings 10.2 of the treatment cells are connected with one another by welding seams 14. Each treatment cell 10 is subdivided into two chambers by a vertical intermediate wall 25 which ends at a distance from the upper and the lower castings 10.1, 10.2 and thereby leaves an upper connecting gap 15 and a lower connecting gap 16. A first chamber is identified with reference numeral 17, while a second chamber is identified with reference numeral 18. Three parallel perforated gasification pipes 19 are arranged in the second chamber 18 provided with a clarifying water outlet 13. A syphon 20 is arranged before the clarifying water inlet 12a of the treatment cell 11 which is arranged at the left in FIG. 1 and is the deepest cell. The clarifying water is supplied through the syphon 20 into the treatment cell pack. The right uppermost treatment cell 10 of the treatment cell pack shown in FIG. 1 is connected through an opening 21 with the aspiration side of a fan 22. The clarifying water outlet 13a can be connected in a not shown manner with the clarifying water inlet 12b of a second treatment cell pack, located at the same height.

The negative pressure produced by the fan 22 acts in all treatment cells through the gap-like connecting openings 12 and 13 provided between the individual treatment cells. Due to the negative pressure, air which is supplied in the treatment tube 19 in form of bubbles identified by points in FIG. 1 is pulled upwardly through the clarifying water and lifts the clarifying water level in the second chamber 18 so that the clarifying water is discharged through the clarifying water outlet 13 located vertically higher than the clarifying water inlet 12, into the subsequent treatment cell 10 which is located higher. In this manner, an intense gasification is performed in each treatment cell 10 and simultaneously a vertical transportation of the clarifying water is obtained.

Clarification mud 23 can deposit on the bottom of each treatment cell 10. It can be removed continuously or periodically by a not shown scraper which is bringable into the treatment cells through their end side. The first and lowest treatment cell 10 of the treatment cell pack serves for depositing of the not-swimming matter and can be provided for this purpose with a greater lower connecting gap 16. The gasifying of the treatment cells 10 through the gasifying tube 19 can be performed intermittently. The clarifying water can be supplied in the treatment cells in an upwardly and downwardly oscillating movement which contributes to the gasification effect.

Figure 2:
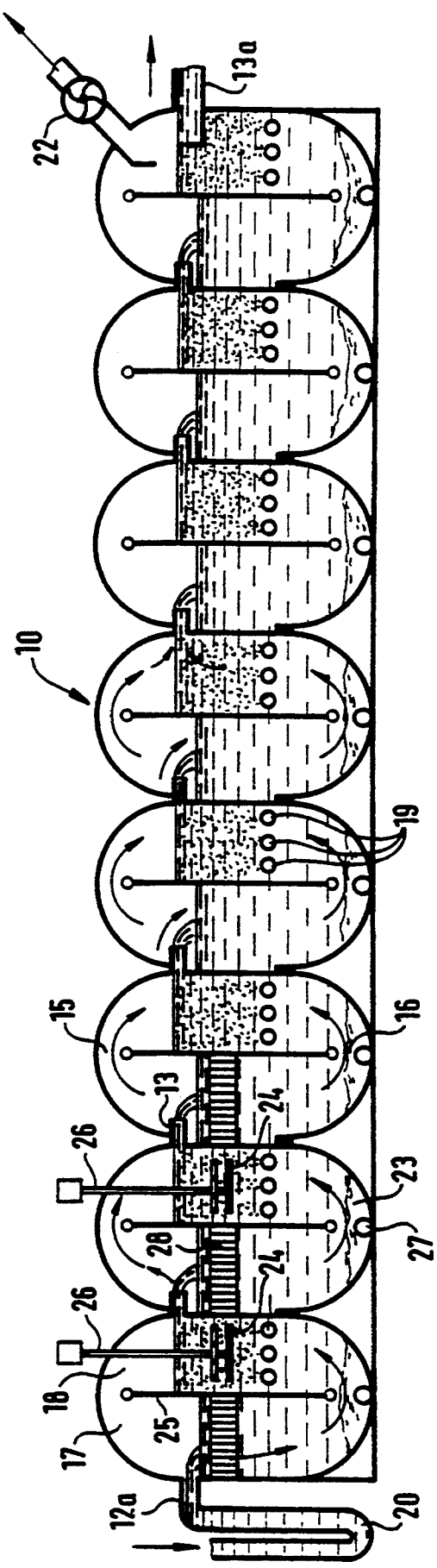
FIG. 2 is a view showing the inventive arrangement in form of the treatment cell combination arranged horizontally and provided with additional devices.

FIG. 2 shows a pack of treatment cells 10, in which the treatment cells and thereby the clarifying water inlet 12a and the clarifying water outlet 13a as well as the intermediate clarifying water outlet 13 are located at the same height. In both first treatment cells which follow the clarifying water inlet 12a, dispersing discs 24 are arranged in the second chamber 18 above the gasifying tube 19 on a vertical upwardly reciprocable lifting rod 26. The dispersing discs 24 arranged at a distance from one another are composed of a round wire network with a plurality of throughflow openings. Their movement reinforces the gasifying effect. Moreover, lamella separator 28 for the not flowing matter is arranged in the first treatment cell. FIG. 2 shows lower discharge tubes 27 or discharge openings for the deposited clarification mud 23. A favorable side effect of the negative pressure bubbles and the aspiration principle is the problemless discharge of all mud which is formed at the clarifying water level in the treatment cells 10, through the air path of the treatment cell pack which leads over the upper connecting gap 15 of the treatment cells.

Figure 3:
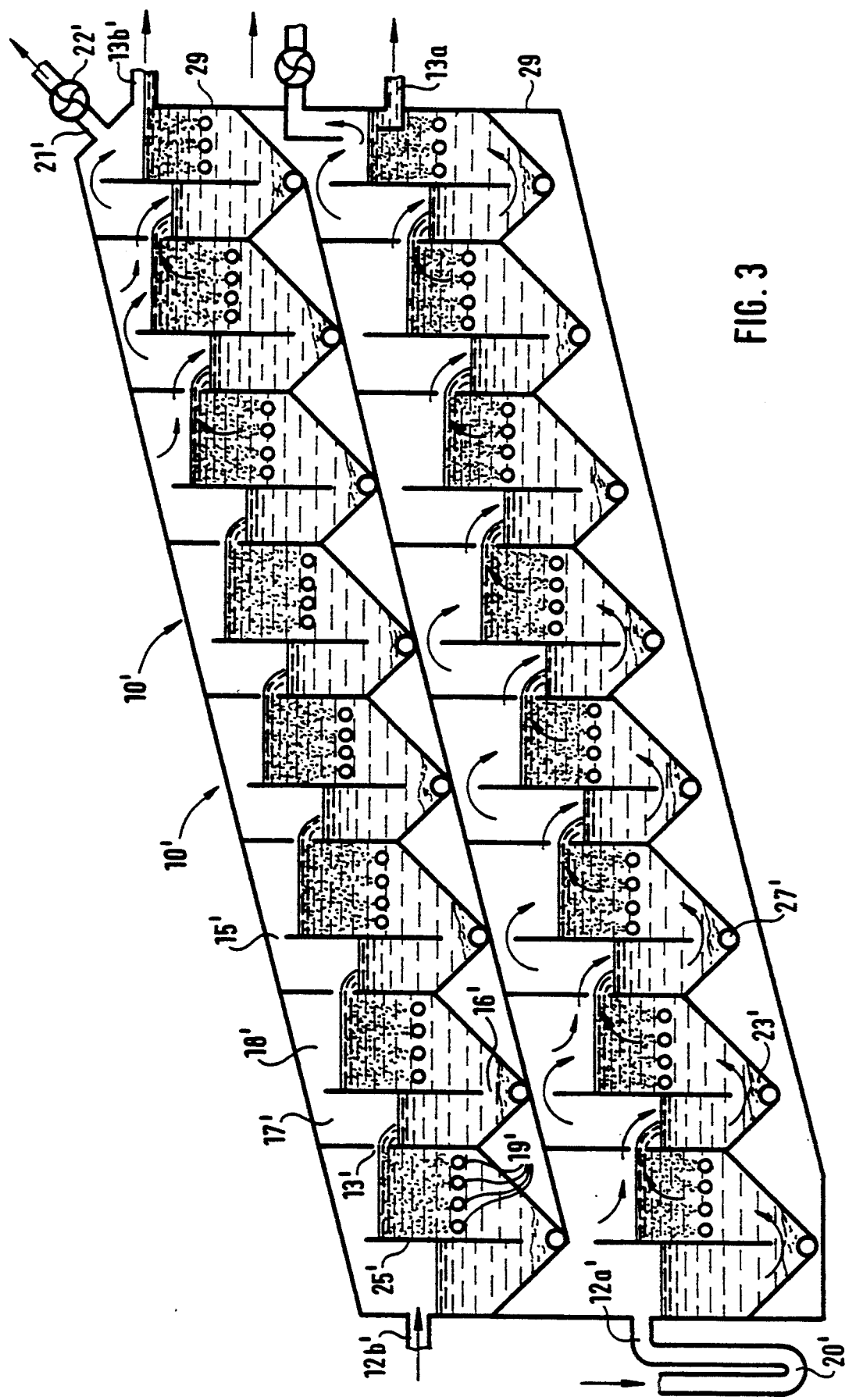
FIG. 3 is a view showing a clarifying arrangement for waste water in accordance with a second embodiment of the invention, with a treatment cell combination with cells raising in horizontal direction.

FIG. 3 shows the same treatment cells as in FIG. 1 which are assembled in a treatment cell pack. The same parts which coincide with the parts of FIG. 1 are identified with the same reference numerals with primes. The difference is that the treatment cells 10' are formed in a stackable body 29, for example as concrete prefabricated parts.

Figure 4:
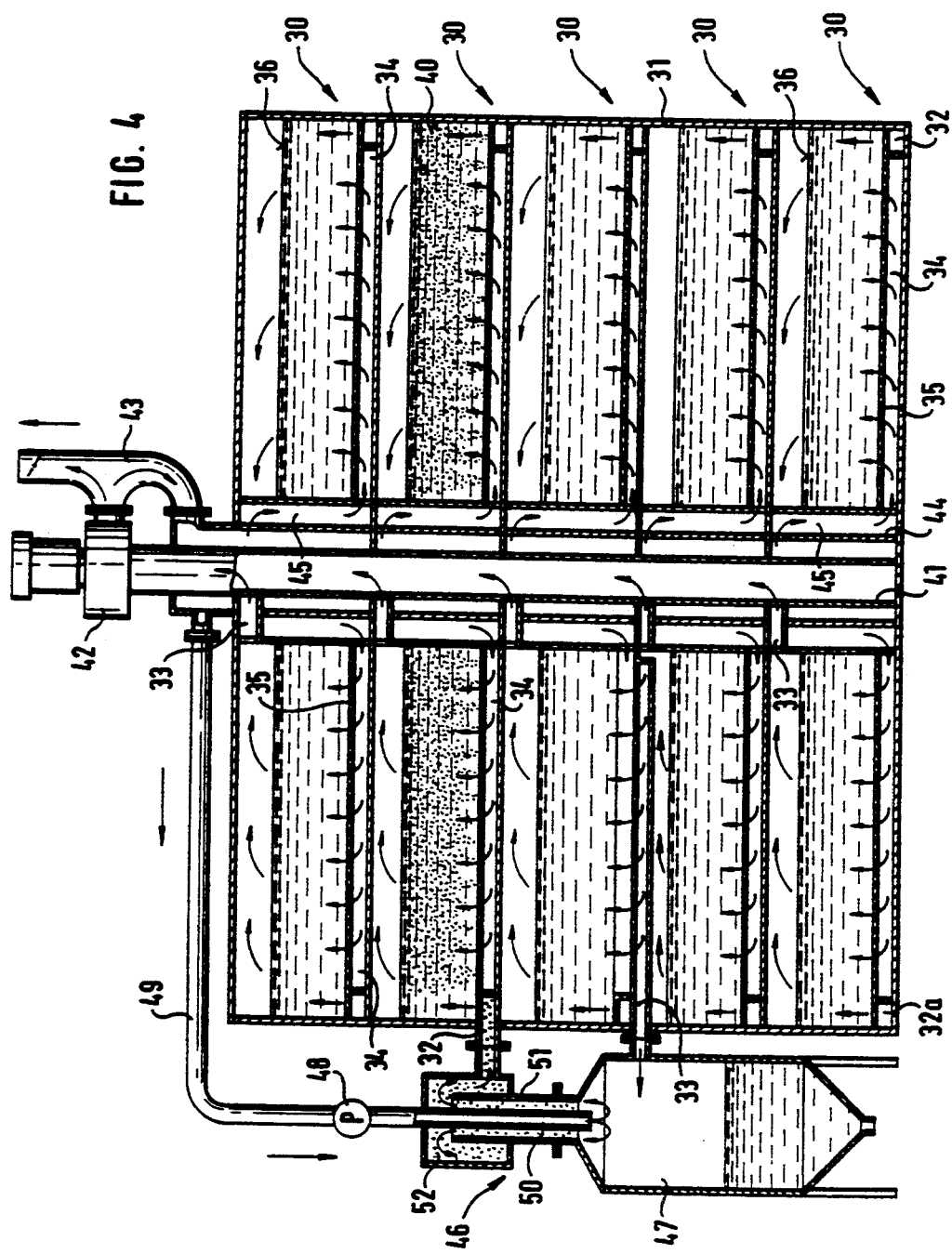
FIG. 4 is a view showing a schematic cross-section of a clarifying device with multi-level treatment cells compound with one another for a waste water throughflow.

FIG. 4 shows another embodiment of the treatment cells which are combined with one another to form a clarifying water throughflow. Here five treatment cells 30 are arranged over one another in a round container in a multi-level structure. The negative pressure in the treatment cells 30 is obtained by a joint fan 42 through a central aspiration conduit 41. Each treatment cell 30 is connected with the aspiration conduit 41 by at least one opening 33. A part of the air which is aspirated through the central negative pressure tube 41 is supplied through a connecting conduit 43 into a distributor tube 44 arranged concentrically to the common aspirating tube 41, into a gas chamber 34 at each level. The gas chamber 34 extends practically over the whole cross-section of each treatment cell 30 and is separated by a sieve wall 35 from the upper region of the treatment cell 30 which receives the clarifying water 36. Due to the negative pressure acting in the treatment cells 30 the air supplied in the gas chamber 34 is transported through the openings of the sieve wall 35 in bubbles 40 through the clarifying water, as identified in one of the five treatment cells 30.

The clarifying water is supplied through a ring-shaped supply passage 32 into the lowermost of the five treatment cells 30, is treated there and then transported further by a negative pressure transporting device into the treatment cell 30 located above. For each such transition a special negative pressure lifting device 46 is provided. One of such negative pressure lifting devices is shown in FIG. 4 and used for transporting the clarifying water from the third treatment cell to the fourth treatment cell 30. Through a discharge trough 33 arranged under the gas chamber 34, the waste water is supplied first into a mud deposit container 47 of the lifting device 46. In the lifting device 46 the negative pressure produced in the fourth treatment cell 30 acts in this cell through the inlet passage 32, on the one hand. On the other hand, the partial air stream supplied by an amplifying pump 48 through a conduit 49 from the pressure side of the fan 42, is supplied through a pressure lance 50 into a rising tube 51 of the lifting device 46. The air raises in it with co-movement of the clarifying water upwardly in a collecting chamber 52, and from there is supplied together with the air in the ring-shaped inlet conduit 32, to the fourth treatment cell 30.

Figure 5:
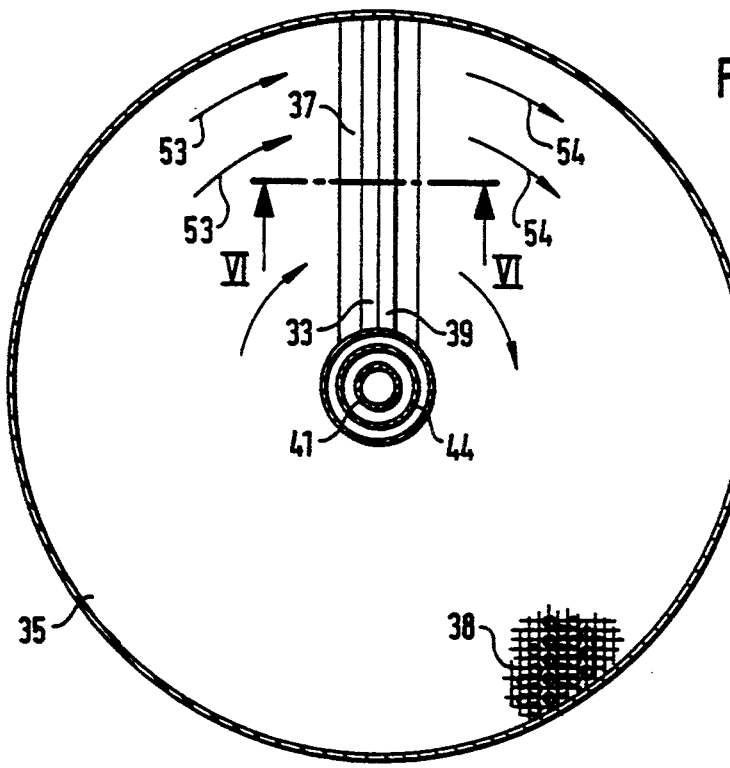
FIG. 5 is a plan view of the aeration plate of one bottom of the clarifying arrangement of FIG. 4.
Figure 6:
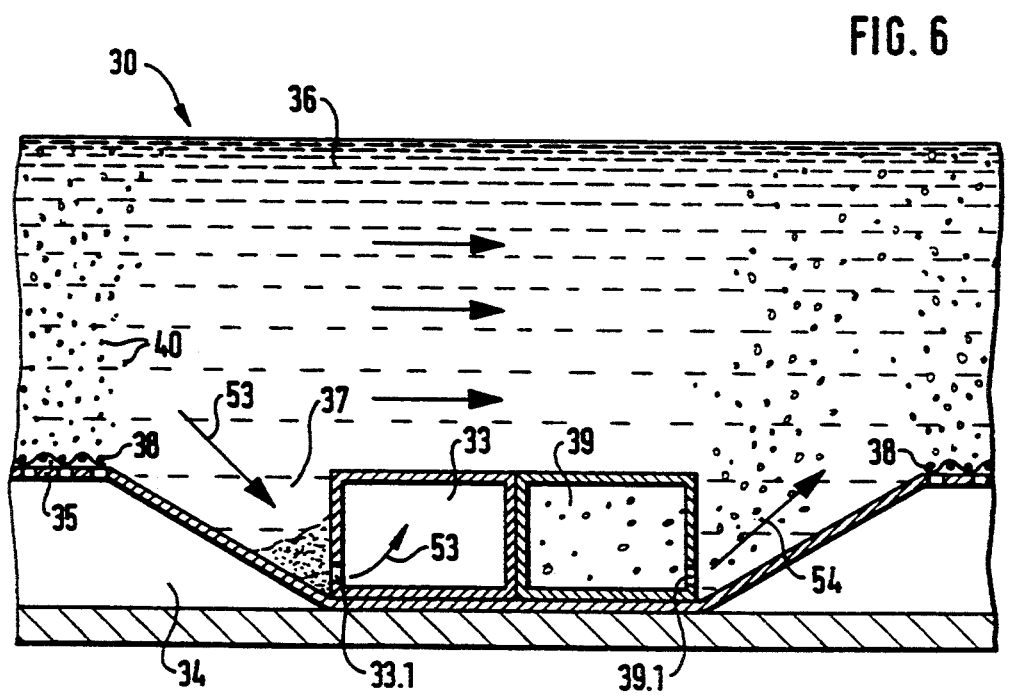
FIG. 6 is a partial cross-section through the aeration plate taken along the line VI—VI in FIG. 5 on an enlarged scale.

The sieve wall 35 which is shown in FIGS. 5 and 6 and separates the gas chamber 34 from the upwardly located region of each treatment cell 30 which receives the clarifying water 36, is provided with a radially extending trough 37. A round wire grate 38 is located on the sieve wall as shown in FIG. 5. It acts so that the air bubbles 40 which raise through the openings of the sieve wall 35 are subjected to Coanda-effect which contributes to their raising. Two radially extending passages are formed in the radial trough 36. They include a clarifying water withdrawal passage 33 and a passage 39 which is connected with the clarifying water inlet passage 32. Through lateral slot 33.1 of the withdrawal passage 33, the clarifying water 36 is withdrawn together with the entrained mud accumulated in the depression 37 before the slots. The clarifying water/air mixture which comes from a lifting device 46 is supplied into the treatment cell 30 through the side slot 39.1 of the channels 39 formed at the opposite side of the trough 37. The withdrawal arrow 53 and the supply arrow 54 identify this process. Due to the tangential inflow of the clarifying water through the lateral slot 39.1, the clarifying water performs rotary movement in the treatment cells 30.

Figure 7:
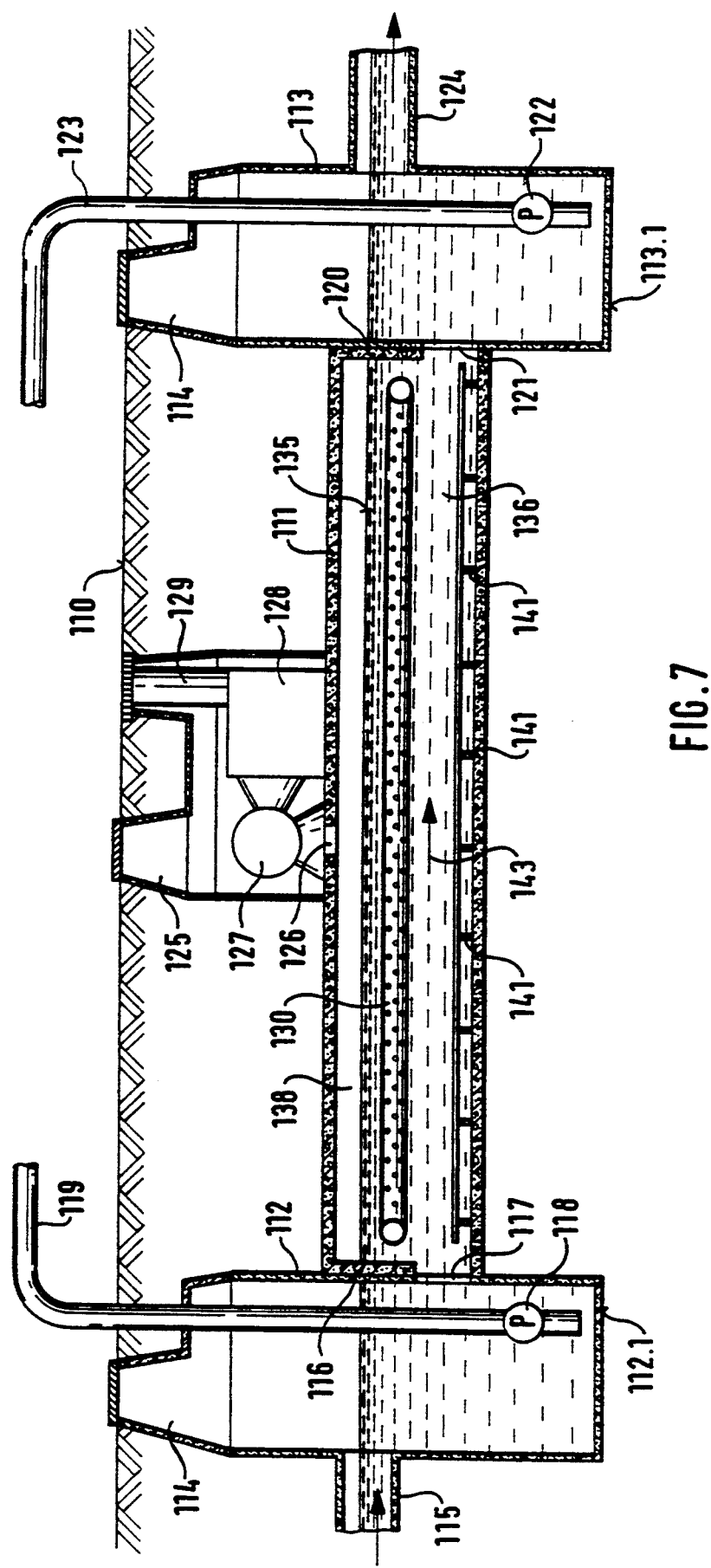
FIG. 7 is a view showing an embodiment of a clarifying arrangement, formed as a tubular treatment cell with a schematical central longitudinal section through the clarification tube and a preceding and a subsequent container of the clarifying device.
Figure 8:
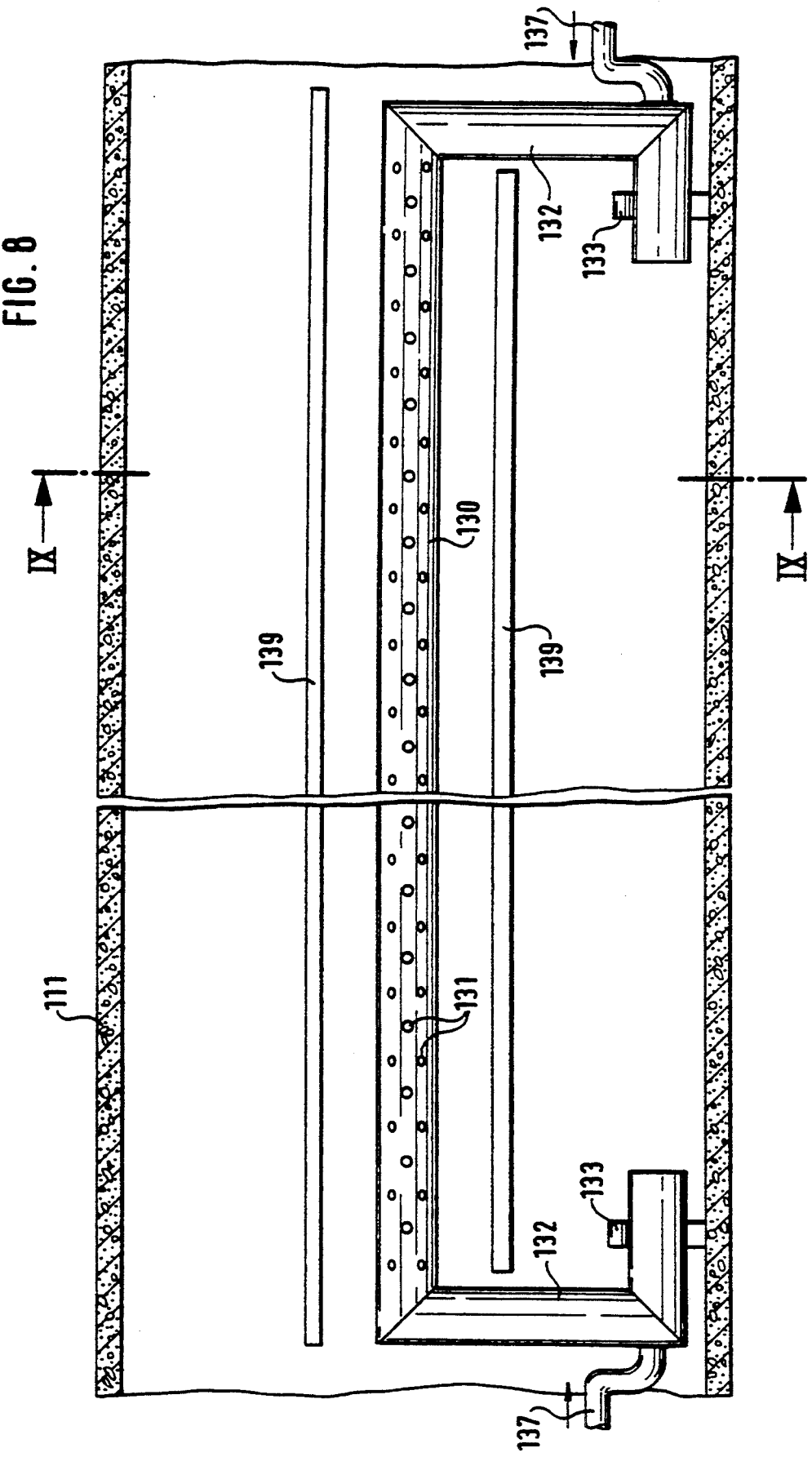
FIG. 8 is a view showing a central longitudinal section through the clarification tube in a plane transverse to the cutting plane of FIG. 7 on an enlarged scale.
Figure 9:
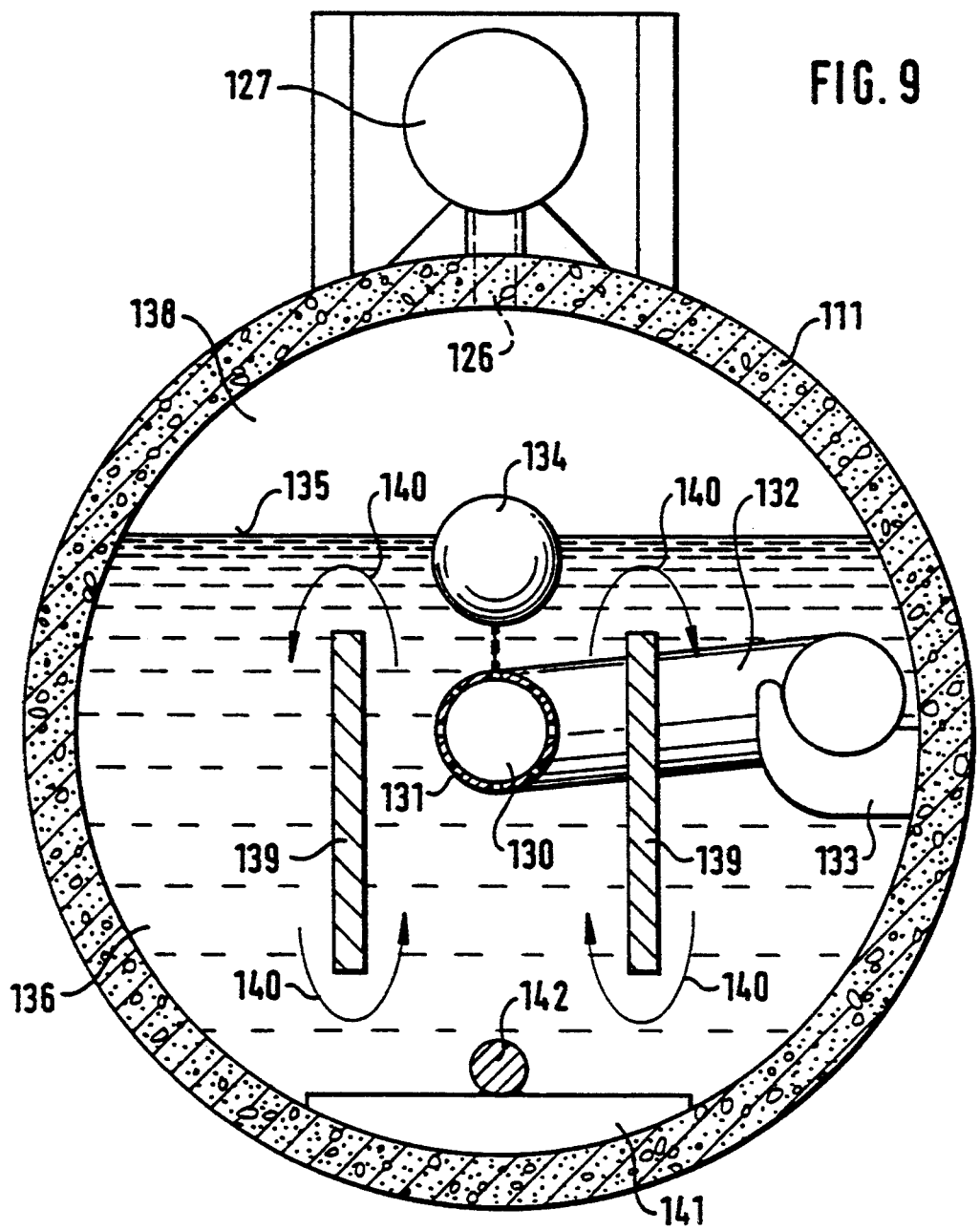
FIG. 9 is a view showing a cross-section through the clarification tube taken along the line IX—IX in FIG. 8 and turned by 90° in the natural vertical orientation of the parts.

FIGS. 7-9 show a treatment cell of a clarifying arrangement formed as clarification tube. The core of the clarifying arrangement which is shown in FIG. 7 and is located under the ground surface 110, is a lying concrete tube 111 arranged between two shaft containers 112 and 113 which are also composed of concrete tubular bodies and provided with entry pieces 114. The left shaft container 112 serves as a pre-clarifying container in which a waste water supply conduit 115 opens. The clarification tube 111 is connected by its end side with the shaft container 112, and the upper and greater part of this end side is closed by a wall 116. The supply opening 117 of the clarification tube 111 is located at a distance from the bottom 112.1 of the shaft container 112. Therefore solid matter can deposit in the bottom region of this pre-clarifying container and can be transported outwardly by a mud pump 118 through a conduit 119.

The shaft container 113 arranged at the other end of the clarification tube 111 serves as a post-clarifying container. At this end the end side of the clarification tube 111 is closed in its upper and greater part by a wall 120. The connecting opening 121 of the clarification tube 111 is located there above the bottom 113.1 of the shaft container. Therefore, there also solid matter can deposit in the bottom region and can be transported outwardly by a mud pump 122 through a conduit 123. The treated waste water flows out from the shaft container 113 through a discharge tube 124.

A ventilating device accessible through entry piece 125 is arranged on the clarification tube 111 in its central region. It has a fan 127 arranged over a tubular opening 126 and a filtering device 128 for the gas supplied by the fan 127 from the clarification tube 111. The gas, in particular air, is supplied outwardly from the filtering device through a shaft 129.

The construction of the clarification tube 111 is shown in the sectional views of FIGS. 8 and 9. A ventilation tube 130 is arranged in its interior and provided with nozzle openings 131. It extends in the longitudinal direction of the clarification tube 111, and is suspended at both ends by tubular, angled turning lever 132 in a bearing fork 133 mounted on the wall of the clarification tube 111. Float bodies 134 are mounted on the aeration tube 130, and one of the floating bodies is shown in FIG. 9. Due to the floating bodies 134, the turnably supported aeration tube 130 is held always at the same distance from the waste water level 135 available in the clarification tube 111. Gas, in particular air is supplied into the aeration tube 130 through hose conduits 137 shown in FIG. 1 and through hollow turning levers 132 from a not shown pressure source. After its exit from the aeration tube and its passage through the waste water 136 it arrives at the chamber 138 of the clarification tube 111 which is located above the waste water 11. The chamber 138 has a negative pressure under the action of the fan 127. The fan 127 discharges the air from the clarification tube through the filtering device 128.

Vertical guiding walls 139 are located at both sides of the aeration tube 130 in the region filled with the waste water 136 and at a distance from the aeration tube as well as at a distance from the waste water level 135 and at a distance from the wall of the clarification tube. In a not shown manner they are mounted by supporting rods on the wall of the clarification tube 111. The guiding walls 139 serve for forming a circulating flow of the waste water inside the clarification tube 111 as shown by the arrow 140.

Scrapers 149 are arranged at the deepest point of the lying clarification tube 111 at uniform distances and on a common connecting rod 142 as shown in FIG. 9. The scrapers can move along the tube in the longitudinal direction in a pilgrim step motion by a not shown drive, then are lifted upwardly and in the lifted condition move back to their initial position and lowered there. Thereby the deposited mud can be withdrawn from the tube opposite to the throughflow direction of the waste water from the clarification tube 111 as identified by an arrow 143 in FIG. 7, and in particular through the inlet opening 117 in the shaft container 112 which serves as a pre-clarification container.

The clarifying arrangement can have several clarification tubes 111 which are arranged coaxially and provided with aeration tubes, wherein different gases can be supplied to the aeration tubes. With a regulation of the waste water level in the clarification tubes 111, also immovable ventilation tubes can be provided. The clarification tubes 111 can have not shown connecting openings, through which liquid or powdery admixtures can be supplied in the clarification tube and the waste water accommodated in it. A chain conveyor movable in a circulating motion can be utilized as a mud transporting device. Its transporting element can move through the waste water free upper region 138 at the discharge-side end of the clarification tube 111. The ventilation device can be connected with the end-side end of the clarification tube 111.

It will be understood that each of the elements described above, or two or more together, may also find a useful application in other types of constructions differing from the types described above.

While the invention has been illustrated and described as embodied in a clarification device for waste water it is not intended to be limited to the details shown, since various modifications and structural changes may he made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A clarifying device for waste water comprising a plurality of containers for receiving waste water; means aerating or gasifying waste water in at least one of said containers, said containers being formed as treatment cells which are combined in a series liquid flow arrangement with one another to provide a waste water throughflow, said treatment cells being closed from outside; and negative pressure source means connected with said treatment cells for producing negative pressure in each of the treatment cells, each of said treatment cells being provided with a substantially vertical intermediate wall which subdivides an interior of said treatment cell into two chambers and defines in each treatment cell an upper connecting opening and a lower connecting opening, one of said chambers being provided with a clarifying water inlet and the other of said chambers being provided with a clarifying water outlet, said inlet and outlet being offset relative to one another in a vertical direction, wherein said aerating or gasifying means in said at least one container is located in said other chamber which is provided with said clarifying water outlet so that a transport of waste water from one of said containers to another of said container is caused by airlift of the waste water through air bubbles rising through the waste water in said other chamber of each treatment cell, the bubbles being drawn in by a reduced pressure.

2. A clarifying device as defined in claim 1, wherein each of said treatment cells is provided with at least one gas supplying means which is located under a waste water level and from which gas is withdrawn at least with assistance of the negative pressure source means and aspirated through the waste water upwardly in form of bubbles.

3. A clarifying device as defined in claim 2, wherein said gas supplying means has a gas permeable wall and is stationary.

4. A clarifying device as defined in claim 1; and further comprising a syphon which connects said clarifying water inlet of a first one of said treatment cells as considered in a waste water throughflow direction, with a waste water supply passage, at least one of said treatment cells having a waste water free region which is connected with said negative pressure source.

5. A clarifying device as defined in claim 1, wherein said treatment cells together form a treatment cell pack composed of a metal sheet material.

6. A clarifying device as defined in claim 1, wherein said treatment cells together form a treatment cell pack composed of a synthetic plastic material.

7. A clarifying device as defined in claim 1, wherein said treatment cells together form a treatment cell packs composed of a plurality of blanks which are welded with one another.

8. A clarifying device as defined in claim 1, wherein said treatment cells together form a treatment cell packs composed of a plurality of castings connected with one another.

9. A clarifying device as defined in claim 1, wherein said treatment cells form treatment cell packs which are formed in a concrete prefabricated structure.

10. A clarifying device as defined in claim 1, wherein said treatment cells have bottoms on which mud deposit regions are formed; and further comprising means for emptying said mud deposit regions.

11. A clarifying device as defined in claim 10, wherein said emptying means include closeable emptying openings provided in said treatment cells.

12. A clarifying device as defined in claim 1, wherein said negative pressure source means is formed as a fan.

13. A clarifying device as defined in claim 12, wherein said fan has an output side; and further comprising a filter arranged on said output side of said fan.

14. A clarifying device as defined in claim 1, wherein said negative pressure source means is formed as a negative pressure generator which produces negative pressure pulses.

* * * * *